United States Patent
Wei et al.

(10) Patent No.: US 10,027,699 B2
(45) Date of Patent: Jul. 17, 2018

(54) PRODUCTION PROCESS KNOWLEDGE-BASED INTRUSION DETECTION FOR INDUSTRIAL CONTROL SYSTEMS

(71) Applicant: Siemens Aktiengesellschaft, Munich (DE)

(72) Inventors: Dong Wei, Edison, NJ (US); Leandro Pfleger de Aguiar, Lawrenceville, NJ (US); Arquimedes Martinez Canedo, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 180 days.

(21) Appl. No.: 15/066,289

(22) Filed: Mar. 10, 2016

(65) Prior Publication Data
US 2017/0264629 A1    Sep. 14, 2017

(51) Int. Cl.
H04L 29/06    (2006.01)

(52) U.S. Cl.
CPC ...... H04L 63/1433 (2013.01); H04L 63/1416 (2013.01)

(58) Field of Classification Search
CPC .............. H04L 63/1433; H04L 63/1416
See application file for complete search history.

(56) References Cited

U.S. PATENT DOCUMENTS

| | | | | |
|---|---|---|---|---|
| 9,009,084 B2* | 4/2015 | Brandt | ............... | H04L 63/1408 706/12 |
| 9,413,852 B2* | 8/2016 | Lawson | ............ | G05B 19/4185 |
| 2005/0015624 A1* | 1/2005 | Ginter | ..................... | G06F 21/55 726/4 |
| 2012/0198277 A1* | 8/2012 | Busser | ................ | H04L 63/1416 714/26 |
| 2012/0284790 A1* | 11/2012 | Bhargava | ............ | G06F 11/3612 726/22 |
| 2013/0212669 A1* | 8/2013 | Wilson | ................ | H04L 63/1416 726/12 |
| 2014/0283047 A1* | 9/2014 | Dixit | ....................... | G06F 21/55 726/23 |
| 2014/0337000 A1* | 11/2014 | Asenjo | ................ | G06F 17/5009 703/13 |
| 2015/0346706 A1* | 12/2015 | Gendelman | .......... | G05B 19/058 700/79 |

(Continued)

OTHER PUBLICATIONS

Dina Hadziosmanovic et al. "Through the Eye of the PLC: Towards Semantic Monitoring for Industrial Control Systems".

(Continued)

*Primary Examiner* — Anthony D Brown
*Assistant Examiner* — William A Corum, Jr.

(57) ABSTRACT

A system for threat detection in an industrial production environment comprises a programmable logic controller. This programmable logic controller includes a process image updated according to a scan cycle with process data associated with one or more field devices, a program configured to operate the one or more field devices using the process data, and one or more function blocks. These function blocks are configured to monitor the process data in the process image during each scan cycle, and identify a possible cyberattack based on the process data.

18 Claims, 7 Drawing Sheets

(56) References Cited

U.S. PATENT DOCUMENTS

| | | | |
|---|---|---|---|
| 2016/0078365 A1* | 3/2016 | Baumard | G06F 21/552 |
| | | | 706/12 |
| 2016/0149944 A1* | 5/2016 | Obermeier | H04L 63/1425 |
| | | | 726/23 |
| 2016/0261482 A1* | 9/2016 | Mixer | H04L 43/12 |
| 2016/0330225 A1* | 11/2016 | Kroyzer | G06F 21/552 |
| 2017/0061783 A1* | 3/2017 | Nalukurthy | G08B 29/186 |
| 2017/0126712 A1* | 5/2017 | Crabtree | H04L 63/1416 |
| 2017/0126745 A1* | 5/2017 | Taylor | H04L 63/205 |
| 2017/0230410 A1* | 8/2017 | Hassanzadeh | H04L 63/1441 |
| 2017/0270295 A1* | 9/2017 | Park | G06F 21/552 |

OTHER PUBLICATIONS

Karen Scarfone; Peter Mell; "Guide to Intrusion Detection and Prevention Systems (IDPS)".

\* cited by examiner

PRODUCTION PROCESS KNOWLEDGE-BASED INTRUSION DETECTION FOR INDUSTRIAL CONTROL SYSTEMS

TECHNICAL FIELD

The present invention relates generally to systems, methods, and apparatuses for enhancing security in industrial control systems by detecting and reacting to intrusions based on the production process information.

BACKGROUND

An intrusion detection system (IDS) is a device or software application that monitors network or system activities for malicious activities or policy violations and produces reports to a security incident and event management station. An IDS detects potential cyberattacks in different ways. There are host based (HIDS) and network based (NIDS) intrusion detection systems. Host intrusion detection systems run on individual hosts or devices on the network. Network intrusion detection systems detect potential cyberattacks based on the network traffic patterns.

A HIDS typically monitors the inbound and outbound data packets from the device only and generate alerts and sends to the user or administrator if suspicious activity is detected. It also monitors behavior of the host device, such as CPU and memory usage to detect potential cyberattacks. If the usage of memory deviates from the normal, the alert is sent to the administrator to investigate. An example of HIDS usage can be seen on distributed control systems (DCS) in chemical industry, in which the cycle time is not supposed to be above 100 milliseconds.

Network intrusion detection systems (NIDS) are connected to the network to monitor data traffic to and from all devices on the network. It performs an analysis for passing traffic on the entire subnet, works in a passive mode, and matches the traffic that is passed on the subnets to the library of known attacks. Once the attack pattern is identified, or abnormal network traffic behavior is sensed, the alert can be sent to the administrator. Example of the NIDS would be installing it on the subnet where firewalls are located in order to see if someone is trying to break into the firewall.

While HIDS and NIDS have been widely used for threat detection on enterprise network in an Internet Technology (IT) world, intrusion detection systems are not currently available for industrial production plants because the HIDS and NIDS technology is not easily extended to such environments. For example, most plant floor networks use heterogeneous proprietary networks and communication protocols; therefore it is not trivial to collect data traffic patterns to run a NIDS. Controllers or other legacy devices were designed for control functionalities; as a result, it is not easy to implement and deploy HIDS on those devices due to limited computational power and memory. At the same time, controllers and other production devices have access to production process information that provides a unique knowledge base not available on more generic enterprise systems. Accordingly, it is desired to apply this production process information to address the intrusion detection deficiencies in industrial production plants.

SUMMARY

Embodiments of the present invention address and overcome one or more of the above shortcomings and drawbacks, by providing methods, systems, and apparatuses related to detecting and reacting to intrusions based on the production process information. Briefly, the intrusion detection system described herein uses various types of process information to validate and verify the received data from sensors and command from an HMI or other devices. Three examples of such process information are described herein. First, the state of the production system (e.g., Stopped, Off, Producing and Standby) is gathered to get an understanding of how devices are operated. Secondly, static limits of measurements (e.g., temperature sensors and temperature setting issued by the operator via an HMI) may be used to determine ranges of valid values. Third, dynamic limits of measurements (e.g., the temperature of an oven cannot be raised by 100° C. in 3 minutes) are employed to identify unusual changes in device behavior that may be indicative of an intrusion.

According to some embodiments, a system for threat detection in an industrial production environment comprises a programmable logic controller. This programmable logic controller includes a process image updated according to a scan cycle with process data associated with one or more field devices, a program configured to operate the one or more field devices using the process data, and one or more function blocks. These function blocks are configured to monitor the process data in the process image during each scan cycle, and identify a possible cyberattack based on the process data. In some embodiments, the function blocks are further configured to transmit a message with information related to the possible cyberattack to one or more other production devices. In these embodiments, the system may also include a human-machine interface (HMI) configured to receive the message and display an alert indicative of the possible cyberattacks.

In some embodiments, the function blocks included in the aforementioned system comprise a limit-based intrusion detection function block which is configured to identify limits of physical variables used by the programmable logic controller in execution of the program. During each scan cycle, the limit-based intrusion detection function block determines current values of the physical variables based on the process data and identifies the possible cyberattacks if the current values of the physical variables exceed the limits of the physical variables. In one embodiment, the limit-based intrusion detection function block is further configured to maintain a state model indicative of a current operational state of the programmable logic controller. The limits of physical variables used by the programmable logic controller may then be based on the state model. Various state models may be used including, for example, state models similar to the Organization of Machine Automation and Control's Package Machine Language State Model.

In other embodiments, the function blocks included in the aforementioned system comprise a change-based intrusion detection function block configured to monitor a rate of change associated with a physical variable used by the programmable logic controller in execution of the program over a plurality of scan cycles. This change-based intrusion detection function block can then identify the possible cyberattack if the rate of change exceeds an expected rate of change for the scan cycles.

In other embodiments, the function blocks included in the aforementioned system comprise a change-based intrusion detection function block configured to monitor a rate of change associated with a physical variable used by the programmable logic controller in execution of the program over a plurality of scan cycles. The change-based intrusion detection function block can then identify, based on a reference curve, the possible cyberattack if the rate of change is less than an expected rate of change for the scan cycles.

This reference curve may be generated, for example, using a simulation-based application. In one embodiment, the possible cyberattack is generated collecting first data comprising physical byproducts of the one or more field devices and extracting behavioral information relevant to cyberattacks from the first data. The behavioral information is fused with fieldbus sensor data into a synchronized time series dataset. Next, a simulation of the industrial production environment may be performed using the synchronized time series dataset to yield simulated sensor data. A classification algorithm is applied to the simulated sensor data to yield a probability of cyberattack and the probability of cyberattack is contextualized with process knowledge relevant to the industrial production environment. Then, the possible cyberattack may be identified based on the contextualized probability of cyberattack.

In other embodiments, the function blocks included in the aforementioned system comprise a correlation-based intrusion detection function block configured to monitor a first process information variable to yield a first variable history over a plurality of scan cycles. Additionally, this correlation-based intrusion detection function block monitors a second process information variable to yield a second variable history over the plurality of scan cycles. The correlation-based intrusion detection function block can then identify the possible cyberattacks based on a correlation between the first variable history and the second variable history.

According to other embodiments, a method for cyberattack detection in an industrial production environment includes a programmable logic controller updating a process image according to a scan cycle with process data associated with one or more field devices and operating the one or more field devices using the process data. The programmable logic controller monitors process data in the process image during each scan cycle and identifies a possible cyberattack based on the process data. The programmable logic controller may then transmit a message with information related to the possible cyberattack to one or more other production devices. In some embodiments, the method includes additional features which occur in response to identification of the possible cyberattack. These features may include, for example, reducing production speed, completing production of a current batch and thereafter stopping production, and/or performing one or more operations to stop production immediately.

Various techniques may be used for identifying the possible cyberattack in the aforementioned method. For example, in one embodiment, the programmable logic controller identifies limits of physical variables used by the programmable logic controller in operating the one or more field devices. During each scan cycle, the programmable logic controller determines current values of the physical variables based on the process data and identifies the possible cyberattack if the current values of the physical variables exceed the limits of the physical variables. In other embodiments, the programmable logic controller monitors a rate of change associated with a physical variable used by the programmable logic controller in operating the one or more field devices over a plurality of scan cycles. The possible cyberattack is identified if the rate of change deviates from an expected rate of change for the scan cycles. In other embodiments, the programmable logic controller monitors a first process information variable to yield a first variable history and monitors a second process information variable to yield a second variable history. The possible cyberattack is then identified based on a correlation between the first variable history and the second variable history.

According to other embodiments, an article of manufacture for intrusion detection in an industrial production environment includes a non-transitory, tangible computer-readable medium holding computer-executable instructions for performing a process which includes updating a process image according to a scan cycle with process data associated with one or more field devices and operating the one or more field devices using the process data. The process further includes monitoring the process data in the process image during each scan cycle; and identifying a possible cyberattack based on the process data.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to the application of production process knowledge to improve the accuracy of the intrusion detection systems for industry automation networks. Briefly, the techniques and associated technology described herein may be used to detect cyber intrusion that occurs on the plant floor network, such as a compromised sensor which sends a faked measurement reading to controllers or an HMI, on which a hacker sends faked command(s) to controllers. Conventional intrusion detection systems employ the patterns of data packets and traffic. However, these systems may not be able to detect advanced cyberattacks aiming at industrial control systems. For instance, they are not able to detect Stuxnet-type of cyberattacks. However, using the techniques described herein, production process knowledge can be utilized to detect some cyberattacks (or sensor malfunction or wrong operation by operators) on the plant floor. The disclosed production process uses knowledge-based intrusion detection which may provide a complementary solution to the existing intrusion detection solution for control systems. Furthermore, the techniques described herein are implemented in controllers and hence enabling the controllers to react to detected cyberattacks accordingly to minimize the adverse impacts of those cyberattacks.

Figure 1:
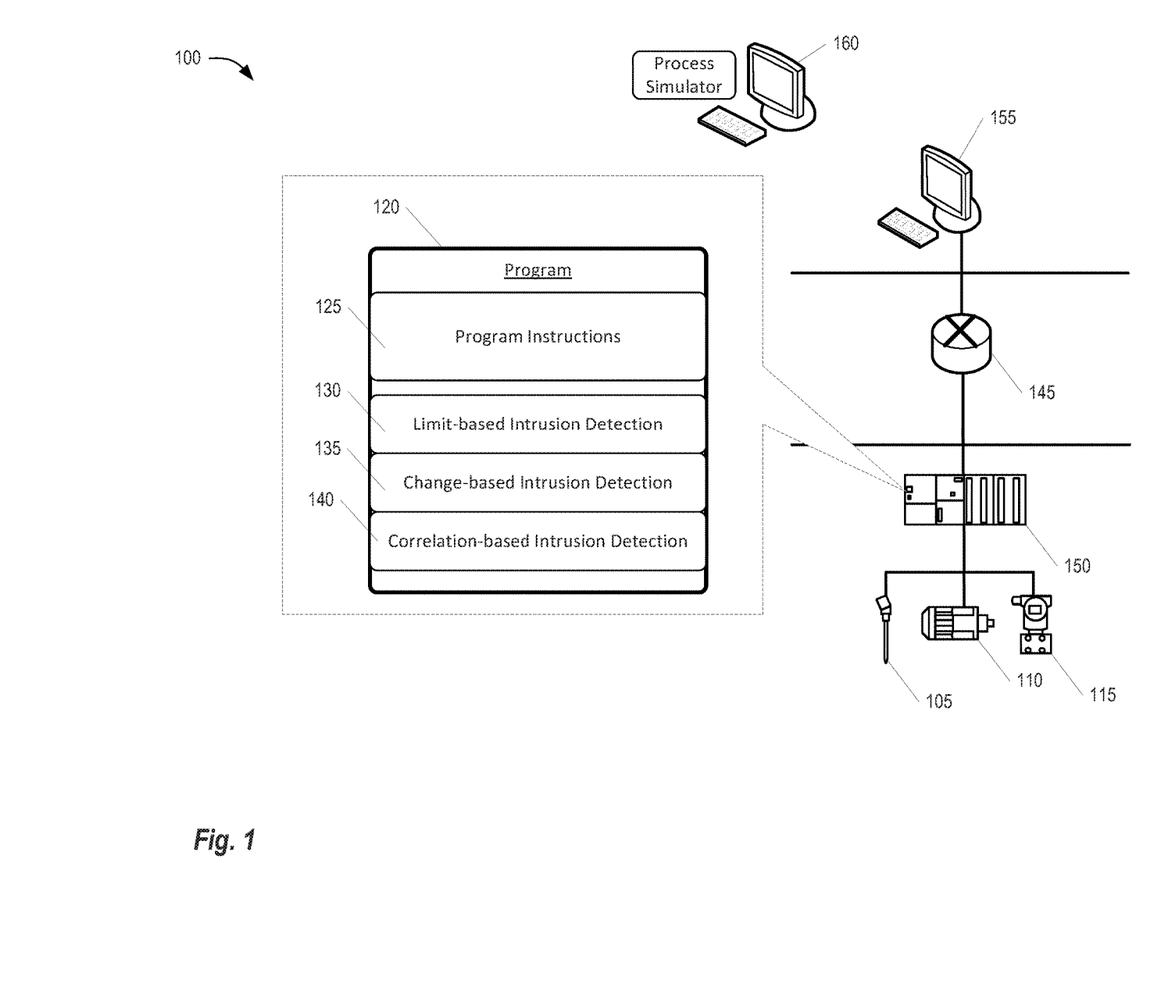
FIG. 1 provides an illustration of an intrusion detection system 100, according to some embodiments.

FIG. 1 provides an illustration of an intrusion detection system 100, according to some embodiments. This system 100 includes a programmable logic controller (PLC) 150 which controls a plurality of field devices 105, 110, and 115. The PLC 150 may be configured to operate automatically or semi-automatically based on instructions provided by an operator via a human machine interface (HMI) 155. In the example of FIG. 1, the HMI 155 communicates with the PLC 150 through an intermediate network device (such as router or switch) 145 over a network. In principle, the HMI 155 and the PLC 150 may be connected by any number of intermediate network devices. Alternatively, the HMI 155 can be connected directly to the PLC 150. Function block (FB) is just a part of application program run on a PLC. The Process Simulator 160 is used to simulate the production process and generate references for control variables which are used in Function Blocks 135 and 140.

The PLC 150 executes a Program 120 according to a scan cycle. The Program 120 includes Program Instructions 125 and a plurality of function blocks (FBs) 130, 135, and 140. It should be noted that the Program 120 shown in FIG. 1 is an oversimplified visualization of a PLC program which highlights functionality related to intrusion detection. A real-world implementation of the PLC 150 would include many additional components directed at other aspects of controller operations. Additionally, although the example of FIG. 1 shows the intrusion detection functionality in one PLC to detect potential cyberattacks on itself, it can also be implemented in a way that one PLC can detect potential cyberattacks on its peer PLCs, if it is able to collect all necessary data from other PLCs.

The Program Instructions 125 comprise the main program executed by the PLC 150. The operation of the field devices 105, 110, and 115 is controlled by the Program Instructions 125. Additionally, the Program Instructions 125 manages input/output, global variables, and access paths. The FBs 130, 135, and 140 are configured to analyze these input/output, global variables, and access paths as they are received or modified to identify conditions which may indicate that a malicious intrusion is taking place. The example of FIG. 1 includes three FBs directed at cyberattack: a Limit-based Intrusion Detection FB 130, a Change-based Intrusion Detection FB 135, and a Correlation-based Intrusion Detection FB 140.

Figure 2:
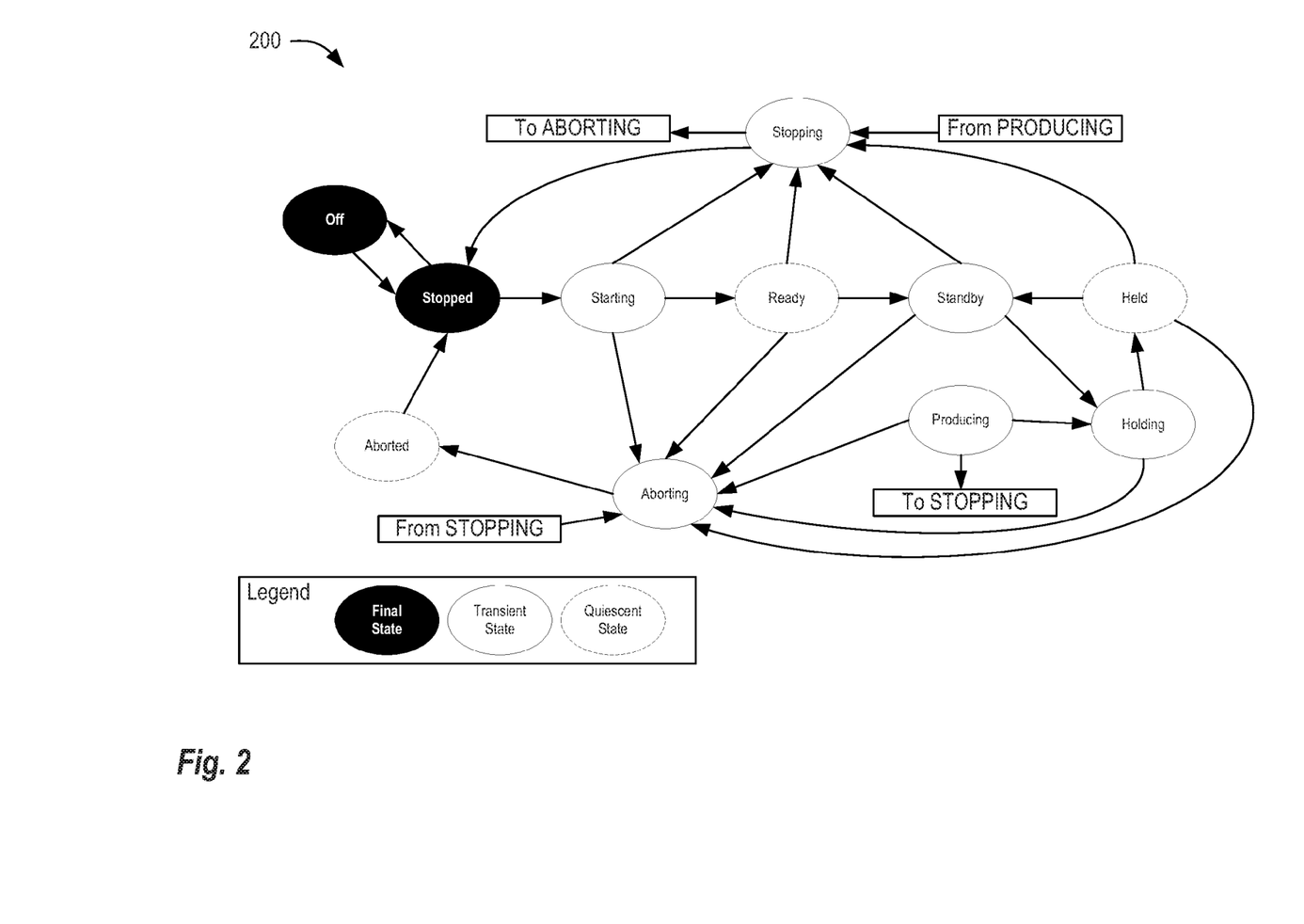
FIG. 2 provides an example implementation of a Package Machine Language State Model, as may be applied in some embodiments.

The Limit-based Intrusion Detection FB 130 examines and validates measurements collected by sensors and commands from the HMI 155 according to the limits of physical variables of the production system. A potential cyberattack is identified when measurements of sensors and commands exceed the limits of physical variables of the production process. For instance, conveyors of a packaging line should run forward in the speed range of 0.25~0.5 m/s when the production line is in the state of "Producing", as shown in FIG. 2 (described below). When the controller receives a reading from the drive of conveyor which indicates the conveyor is running at 0.1 m/s, it could be a cyberattack on the control system or the drive system. Another example is, during the state of "Producing", the controller receives a speed setting of 0.75 m/s from the HMI for the conveyor. This could be a cyberattack on the controller or the HMI is compromised by hackers. The operators should be informed when potential cyberattacks are detected.

Figure 3:
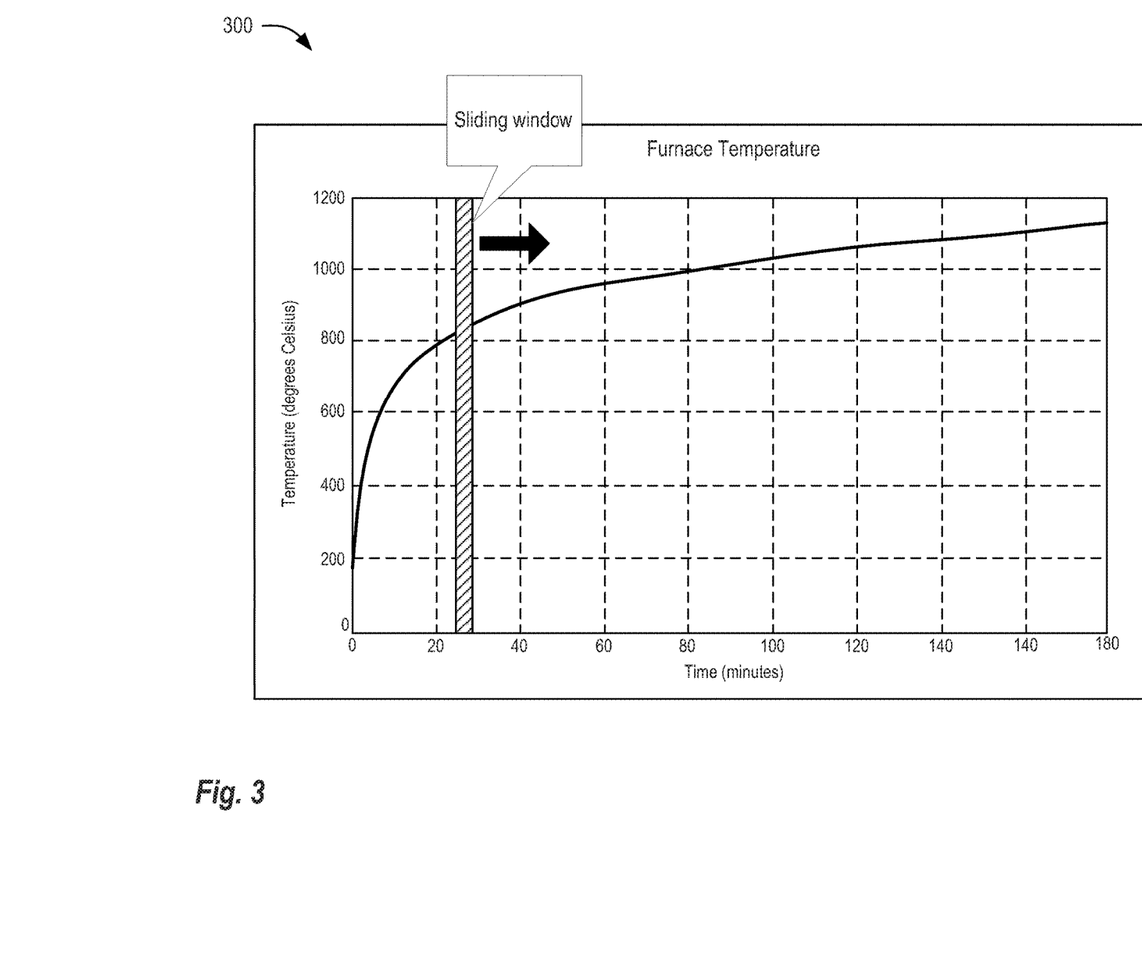
FIG. 3 illustrates how a sliding window technique can be employed for intrusion detection, according to some embodiments.
Figure 4:
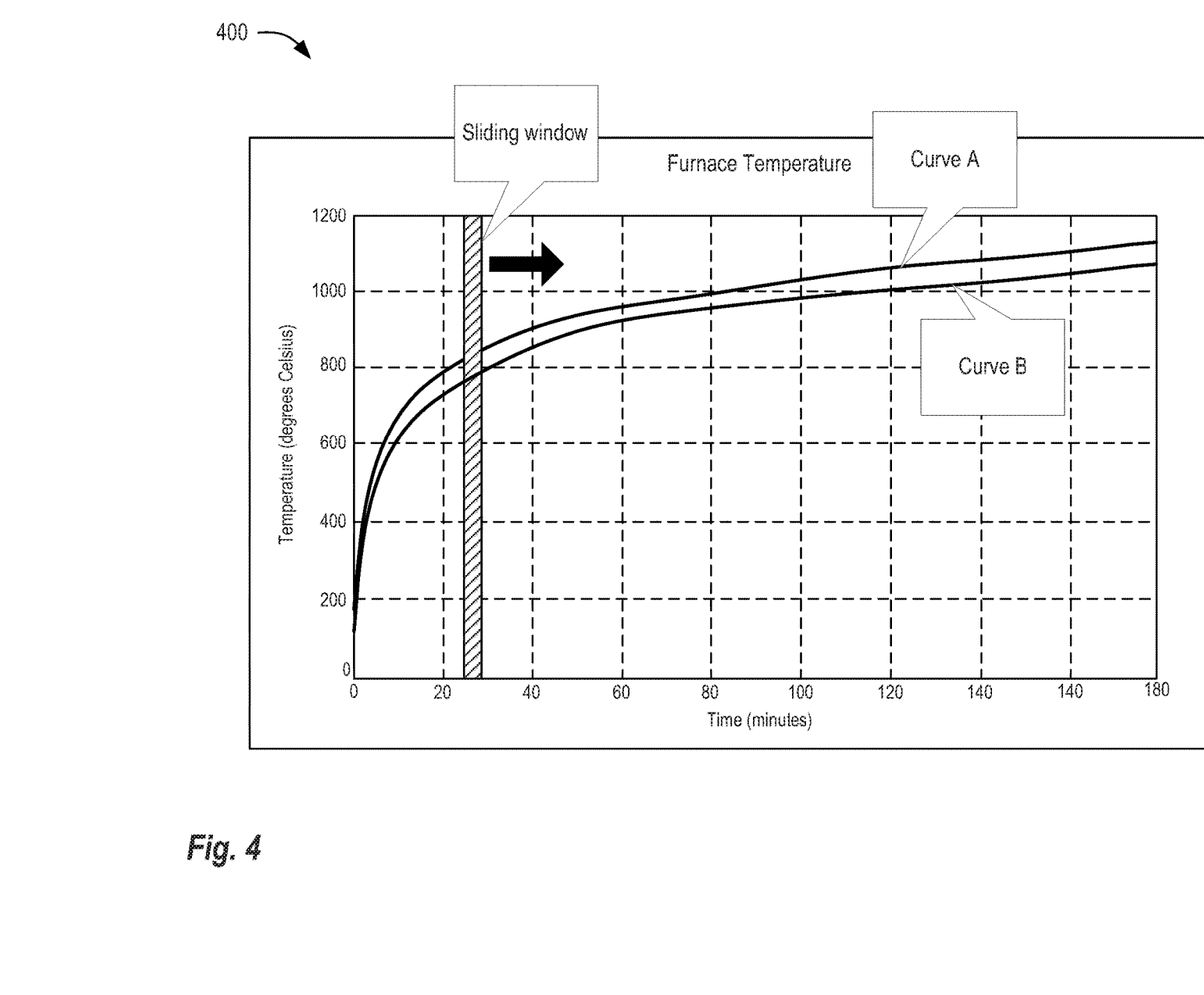
FIG. 4 illustrates how a learning technique can be employed according to some embodiments for intrusion detection where system performance is degraded over time.

The Change-based Intrusion Detection FB 135 performs intrusion detection based on the knowledge that some variables in the process environment cannot be changed in a short period of time. FIG. 3 provides a plot 300 illustrating how a sliding window technique can be employed for intrusion detection in this context, according to some embodiments. In this example, a wireless temperature sensor measures furnace temperature. Assume that, based on the design of a furnace, it is known that the furnace's temperature cannot be increased by 100° C. within 3 minutes. In FIG. 3, the sliding window is moving along the time axis. A data block may be deployed to record the temperature of the furnace temperature reading in the last 3 minutes. If the temperature rises too fast (e.g., 800° C. to 850° C. in 3 minutes), an alarm can be raised that a possible cyberattack is underway on one or more of the devices associated with the furnace. In some instances, is not easy to obtain information to use for this kind of detection, or at times the curve in FIG. 3 could be changed due to wear and tear of isolation material of the furnace, thus the performance in terms of heating could be degraded, as shown in FIG. 4. In some embodiments, a machine learning process is used to adjust and update the reference function curve. For instance, as shown in FIG. 4, Curve A may be used as the reference function at one point. After several months, the heating performance degrades, and then Curve B, which is generated by the latest measurement, can be used as the reference function.

The Correlation-based Intrusion Detection FB 140 performs intrusion detection based on a correlation between process information variables. For example, with an industrial oven having multiple heating elements, the temperature in a certain interval in the oven depends on how many heating elements are on. Assume that a wireless sensor is used to collect temperature information of the industrial oven and there are 10 heating elements which can be operated individually. Usually, it takes 15 minutes to raise the temperature from 20° C. to 400° C. if all heating elements are on. However, if the controller detects that it took 15 minutes to raise the temperature from 20° C. to 400° C. when only 2 heating elements are on, an alarm could be raised that a possible cyberattack is underway.

As an example of intrusion detection by the correlation of variables, consider a pre-heating furnace with 4 zones, where the temperature in a certain interval in the furnace depends on how many heating elements (burners) are on. Assume that three sensors are used to collect temperature information of the furnace in each zone. Let S11 and $T_{11}$ represent the first temperature sensor and the reading of the first sensor in Zone 1, respectively. Let $B_{11}$ and $P_{11}$ represent the first burner and the control of the first burner (on/off) in Zone 1, respectively. Usually, the measurement of each temperature sensor is related to each other. Therefore, $$T_{i,j}(t+\Delta t)=f(\forall_{k=1,4}^{l=1,5} P_{k,l}(t),\Delta t) \quad (1)$$

$$T_{i,j}(t+\Delta t)=f(\forall_{k=1,4}^{l=1,3}(t)) \quad (2)$$

Thus, equations (1) and (2) can be used to calculate the expected reading of every sensor at any time. The actual reading of each sensor is compared with the expected reading to decide if an alarm of abnormal behavior of control system occurred or not. Again, Functions (1) and (2) may change when the efficiency of burner changes and the isolation of the pre-heating furnace changes. Therefore, a learning process is proposed to update these functions during production, which is similar to the learning process in the last subsection.

Continuing with reference to FIG. 1, the Process Simulator 160 performs production process simulation offline. In some embodiments, Process Simulator 160 can be implemented in an office or even an application service provided in a computing cloud.

Complex systems exhibit a large number of behaviors. Therefore, generating a large number of reference function curves (one for each variable of interest and operating condition) may be unfeasible. An alternative to reference function curves defined a-priori is the use of multi-physics simulation to generate reference function curves during the operation. The sensor data is compared against virtual sensor data generated by the simulation and, if the behavior deviates more than a pre-defined threshold, an anomaly is detected. Note that an anomaly can be caused not only by cyberattacks but by failures in the production system. This method is based on the observation that a machine's or production's behavior created by failures, wear & tear, stress, or fatigue generates a different fingerprint than anomalies created due to cyberattacks. Cyberattacks either show a completely unknown behavioral pattern, or show a well-known pattern but at a much more compressed time scale (e.g., malicious attempts to mask an attack as wear and tear can be identified by their accelerated lifecycle). In general, a cyberattack is a sequence of discrete events that cause distinct behavior signatures whereas physical malfunctions tend to show preliminary continuous signs of degradation, before the breakout even happens. One process for intrusion detection via simulation is described below with reference to FIG. 5.

Within the PLC 150, the Limit-based Intrusion Detection FB 130, the Change-based Intrusion Detection FB 135, and the Correlation-based Intrusion Detection FB 140 may be configured in a variety of ways. For example, in some embodiments, the FBs 130, 135, and 140 directly can be implemented, for example, as PC applications on PC-based PLC (such as WinAC) or an extension of main PLC application. In some embodiments, the FBs 130, 135, and 140 are configured to be chained together, allowing the output of one FB to be used as an input for another FB. In this way, it may be possible to create even more sophisticated intrusion detection measures. For example, the output of the Change-based Intrusion Detection FB 135 may indicate a possible intrusion on two independent devices. The Correlation-based Intrusion Detection FB 140 may be configured to correlate these two intrusions to identify a specific type of attack.

Although the example of FIG. 1 shows the intrusion detection functionality provided by FBs, this functionality may be implemented using other technical capabilities of the PLC, if available. For example, in some embodiments, one or more customized software applications (or "apps") may be configured to perform the aforementioned intrusion detection functionality. Examples of implementing apps on PLCs are described in further detail in U.S. patent application Ser. No. 15/040,565, entitled "Extending a Programmable Logic Controller with Apps," filed Feb. 10, 2016 and incorporated herein by reference in its entirety.

In some embodiments, measurements collected by sensors and commands from HMIs (by operators) are automatically examined and validated by the Program 120 according to the state of the production system. To maintain state information on the PLC 150, a state model may be used. An example state model 200 is shown in FIG. 2, developed using the Package Machine Language State Model defined by the Organization of Machine Automation and Control may be employed as shown in FIG. 2. When the received measurements of sensors and commands are not consistent with the state of the production process, an alarm is raised that a possible cyberattack is underway. For example, conveyors of a packaging line should run forward when the production line is in the state of "Producing", as shown in FIG. 2. When the controller receives a signal from the drive of the conveyor which indicates that the conveyor is running backward, an alarm should be raised that the corresponding control system or drive system may be subject to a cyberattack. Another example is that, during the state of "Producing", the controller receives a command from the HMI which turns off the drive of conveyor. This could be a cyberattack on the controller or the HMI is compromised by hackers, since this command should not be issued during the state of "Producing." In this instance, the operator(s) should be informed when potential cyberattacks are detected.

Figure 5:
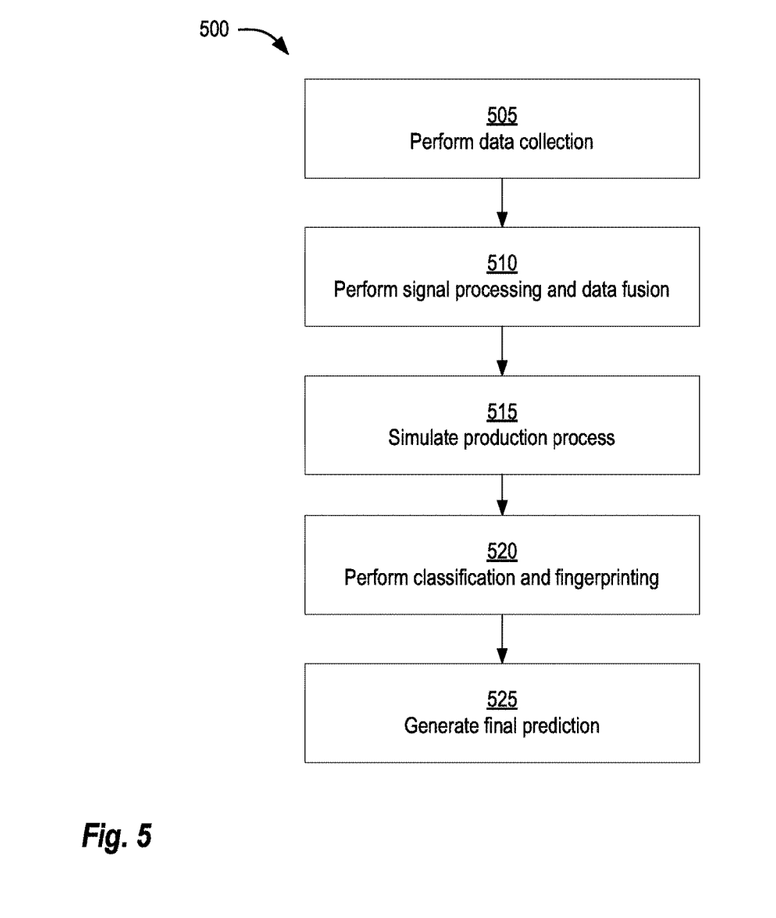
FIG. 5 shows a process 500 for intrusion detection via simulation, as it may be implemented in some embodiments.

FIG. 5 shows a process 500 for intrusion detection via simulation, as it may be implemented in some embodiments. Starting at step 505, data collection is performed. There are two types of data sources that are processed by this step: unconventional and traditional. The unconventional data sources are the physical byproducts of the machines (e.g., sound, vibration, heat, electro-magnetic radiation), and these sources present the novel unconventional signals to our method. The traditional data sources include the fieldbus sensor data that is already an input to the ICS control algorithm to control the plant. For example, a milling-control algorithm that was designed to read and utilize the rotation speed (rpm) data to maintain a constant 500 rpm during operation.

Continuing with reference to FIG. 5, at step 510, signal processing and data fusion is performed. A technical challenge in extracting any useful information from our traditional and unconventional signals is to isolate that signal from all the noise. Having noise much larger than the audio signal is typical of industrial environments and industrial applications. Signal de-noising, system identification, and source separation algorithms will be used for each of the three unconventional data sources to extract the behavioral information we believe will reveal a cyberattack. Accelerometer data can be processed using a low pass filter to eliminate the noise. Thermal camera images can be processed using, for example, OpenCV to perform hot spot analysis. Since the fieldbus traditional signals are directly available, they do not require signal processing other than time series analysis. This step also fuses the different data sources into a synchronized, consistent time series.

Next, at step 515, the production process is simulated using the processed conventional and unconventional data items. Simulation models of the production process are executed in commercially available simulation software such as Siemens NX, Technomatix, Matlab/Simulink. These simulation models typically trade-off speed for accuracy. Therefore, complex processes may require fast simulation models in case near real-time intrusion detection is required. However, physical processes typically have inertia that provides a longer time window for intrusion detection. In these cases, accurate simulations can be used to validate the sensor data.

At step 520, classification and fingerprinting is performed. In cyber-physical systems, cyberattacks physically manifest themselves early; however, it takes a relatively long time to cause damage or malfunction. Therefore, there are two temporal scales, short and long, that will be addressed differently. Short time scale classification will use a probabilistic classifier machine learning algorithm to distinguish between malfunctions and cyberattacks. The choice of algorithms such as neural networks, hidden-Markov or Gaussian-mixture models will be based upon the features of the various physical by-product and fieldbus-data features (e.g., frequency features for sound analysis). The long-time-scale classification can be addressed with an unsupervised learning algorithm that adapts the model according to the physical evolution of the system. Based on typical machine prognostics, the fingerprints may be expected to change over time (e.g., due to wear & tear) and, therefore, the models need to be continuously updated to reflect these physical changes. For this reason, it will be necessary to eliminate the possibility of an attacker being able to predict these patterns and hide his activities using this observation. Both the short and long-time-scale algorithms need the fingerprint information stored in a Fingerprint Database. Conventionally, short term classification uses physical training data from the machine vendor, and the long-time-scale classification uses the fingerprint models generated by the online learning algorithm.

Finally, at step 525, a final prediction is generated using the final reference curve to detect potential cyberattacks. The probability of a cyberattack from the classification and fingerprinting step 520 is a fine grain (physics-based) indicator. However, this information must be put into a higher level context to determine whether to generate an alarm or to ignore the information. This step 525 uses the production process knowledge that is available in the ICS and the data generated by the simulation models to increase or decrease the confidence of a prediction. The process knowledge includes the state of the production system, the limits of process variables, the rate of change on process variables, and the correlation between process variables. It is important to note that both variables sensed from the fieldbus and physical byproducts can be assessed using these metrics.

Figure 6:
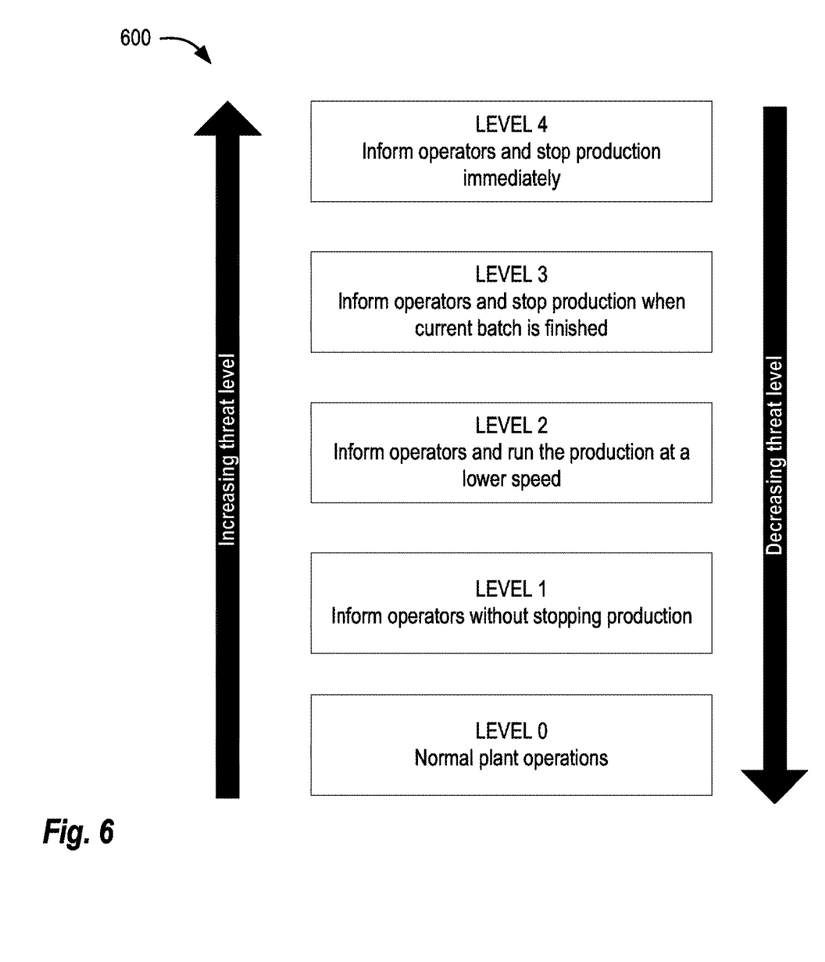
FIG. 6 illustrates five possible threat levels that may be used for representing alert states for automation system operations, according to some embodiments.

FIG. 6 illustrates five possible threat levels 600 that may be used for representing alert states for automation system operations, according to some embodiments. It should be noted that the five levels shown in FIG. 6 are merely an example of how threat levels may be defined in one embodiment of the present invention. The various threat levels employed may be configured and expanded to match the desired security level and criticality of the production process in question or to specific applicable standards and regulations.

In FIG. 6, Level 0 represents normal plant operations. In this mode, sensor information is normally read by a PLC or a distributed control system. Changes to the PLC may be performed in response to the executed control strategy by the controller or as a response by an operator action at, for example, a Supervisory Control and Data Acquisition (SCADA) system. Once a threat is detected, the threat level is raised to Level 1. At Level 1, operators are informed (via a message on an HMI) without stopping production. In this mode, additional logging information may be collected by the PLC and sent to other PLCs or other computing devices in the production system (e.g., server log server or Security Incident and Event Management System). When, the threat level is raised to Level 2, the operators are informed again that the speed of the production line is lowered. At this level, the normal plant operations continue, albeit at a reduced speed.

Continuing with reference to FIG. 6, at Level 3, the PLC begins a soft shut down procedure to stop production when the current production batch is complete. This soft shut down procedure may include, for example, providing instructions to connected smart devices and other PLCs to ensure coordination as the procedure is executed. At Level 4, a hard shut down procedure is executed to stop production immediately. At this level, the PLC sends a signal to all devices involved in the production process to ensure that all devices immediately cease operating.

Figure 7:
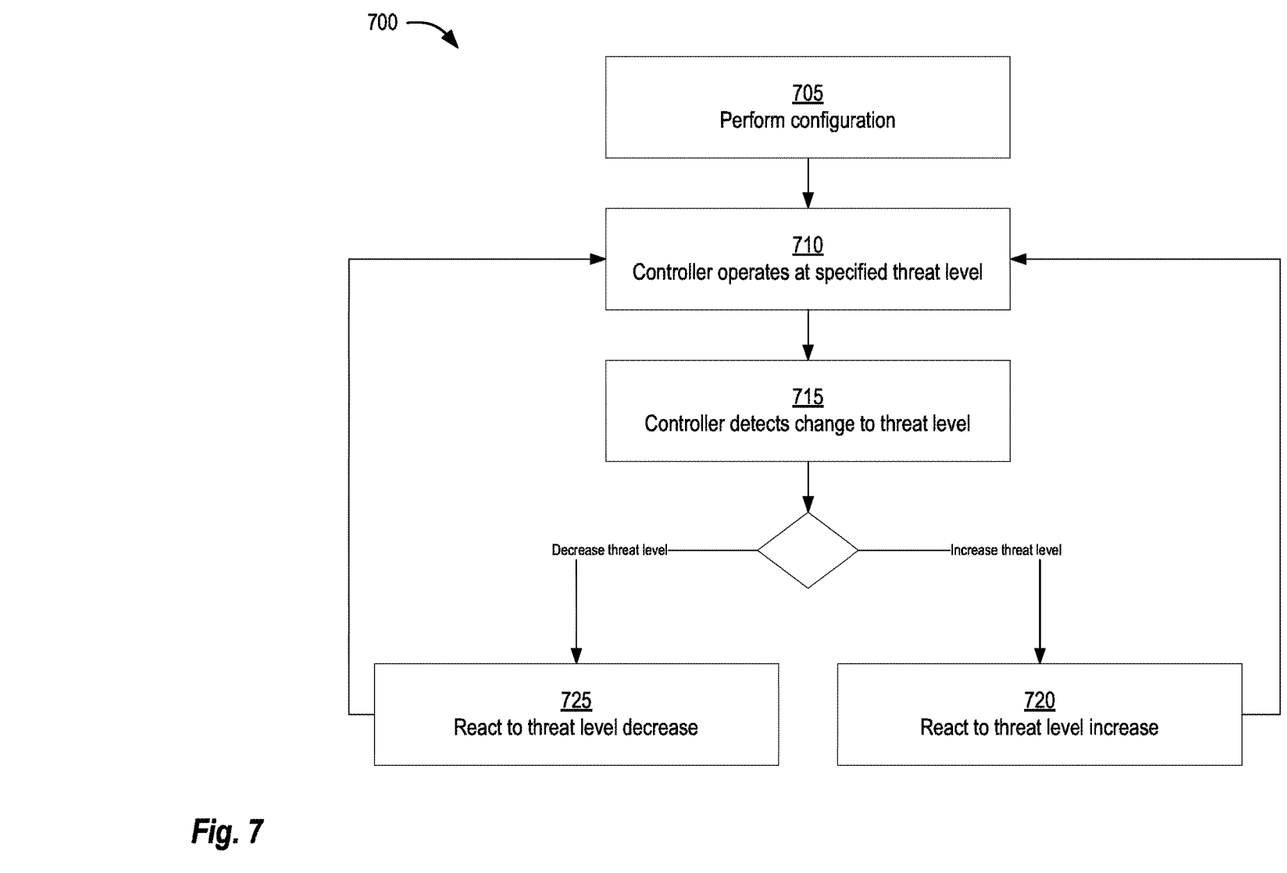
FIG. 7 provides an example process where some of the techniques described herein are applied.

FIG. 7 provides an example process 700 where some of the techniques described herein are applied. Starting at 705, an engineer configures the security of the plant. The configuration includes setting each the threat monitoring FBs for each PLC to an initial threat level for the plant. Additionally, during the configuration step 705, the engineer may define rules for the PLC to automatically change threat levels in response to the detection of possible intrusions. Alternatively, the PLC may be configured to only change threat levels based on manual operations such as receipt of a message from a trusted authority. At step 710, the PLC operates at the current threat level. In this example, where the plant is just being initialized and no threats have been detected, the PLCs operate at the initial threat level, Level 0.

Continuing with reference to FIG. 7, at step 715, the PLC detects a possible intrusion event that requires a change to the threat level. For example, the PLC associated with an oven may include a rule that the temperature of the oven cannot be raised by 100° C. in 3 minutes. If the PLC receives a reading from a temperature sensor indicating that the oven temperature raised by 100° C. in 1 minute, the PLC may then raise the threat level.

If the PLC determines that the threat level should be increased, at 720, the PLC performs one or more preconfigured actions corresponding to an increase in threat level (see FIG. 6). In some embodiments, the threat level may be automatically raised based on rules provided during configuration at step 705. Alternatively, the threat information may be displayed to an operator in an HMI. The operation may then manually raise the threat level to Level 1. Once the threat level is raised, the PLC may send a notification to other devices in the plant. Additionally, the PLC may distribute the related security information (e.g., the reason for the increase in threat level) to the other device so that they may perform additional logging and/or processing locally. At this point, the process 700 returns to step 710 where the PLC operates according to the specified threat level (i.e., Level 1).

If the PLC determines that the threat level should be decreased, at 725, the PLC performs one or more preconfigured actions corresponding to a decrease in threat level. In some embodiments, the threat level may be automatically decreased based on rules provided during configuration at step 705. Alternatively, the threat information may be displayed to an operator who then can manually decrease the threat level to Level 0. Once the threat level is decreased, the PLC may optionally send a notification to the other devices in the plant. At this point, the process 700 returns to step 710 where the devices operate according to the specified threat level (i.e., Level 0). This process 700 continues as long as the PLC is operable, allowing adjustment to the threat level as new potential intrusions are detected.

The programmable logic controllers described herein are another example of a control layer device used in industrial automation environments. A programmable logic controller is typically configured to execute software which continuously gathers data on the state of input devices to control the state of output devices. A programmable logic controller typically includes three major components: a processor (which includes volatile memory), non-volatile memory comprising an application program, and one or more network components (e.g., input/output ports) for connecting to other devices in the automation system.

The processors described herein as used by computing devices (including, without limitation, programmable logic controllers) may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein (including, without limitation, production devices and related computing infrastructure) may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A system for threat detection in an industrial production environment, the system comprising:
  a programmable logic controller comprising:
    a program with executable instructions that control one or more field devices using process data associated with the one or more field devices, the program comprising:
      collecting physical byproduct data associated with the one or more field devices;
      extracting behavioral information relevant to cyberattacks from the physical byproduct data;
      collecting fieldbus sensor data;
      fusing the behavioral information and the fieldbus sensor data into a synchronized time series dataset;
      performing a simulation of the industrial production environment using the synchronized time series dataset to yield simulated sensor data;
      applying a classification algorithm to the simulated sensor data to yield a probability of cyberattack distinguishable from a malfunction; and
      generating a prediction of a possible cyberattack by contextualizing the probability of cyberattack with process knowledge relevant to the industrial production environment.

2. The system of claim 1, wherein the program further comprises:
  in response to the prediction, transmitting a message with information related to the possible cyberattack to one or more other field devices.

3. The system of claim 2, further comprising:
a human-machine interface (HMI) configured to receive the message and display an alert indicative of the possible cyberattack.

4. The system of claim 1, wherein the program further comprises:
identifying limits of physical variables used by the programmable logic controller in execution of the program;
determining current values of the physical variables based on the process data;
identifying the possible cyberattack if the current values of the physical variables exceed the limits of the physical variables.

5. The system of claim 4, wherein the program further comprises:
maintaining a state model indicative of a current operational state of the programmable logic controller,
wherein the limits of physical variables used by the programmable logic controller are based on the state model.

6. The system of claim 5, wherein the state model is similar to the Organization of Machine Automation and Control's Package Machine Language State Model.

7. The system of claim 1, wherein the program further comprises:
over a plurality of scan cycles, monitoring a rate of change associated with a physical variable used by the programmable logic controller in execution of the program; and
identifying the possible cyberattack if the rate of change exceeds an expected rate of change for the plurality of scan cycles.

8. The system of claim 1, wherein the program further comprises:
over a plurality of scan cycles, monitoring a rate of change associated with a physical variable used by the programmable logic controller in execution of the program; and
identifying, based on a reference curve, the possible cyberattack if the rate of change is less than an expected rate of change for the plurality of scan cycles.

9. The system of claim 8, wherein the system comprises a simulation-based application used to generate the reference curve.

10. The system of claim 1, wherein the one or more function blocks includes a correlation-based intrusion detection function block having intrusion detection functionality that comprises:
monitoring a first process information variable to yield a first variable history;
monitoring a second process information variable to yield a second variable history;
identifying the possible cyberattack based on a correlation between the first variable history and the second variable history.

11. A method for cyberattack detection in an industrial production environment, the method comprising:
operating, by the programmable logic controller, the one or more field devices using process data associated with the one or more field devices;
collecting physical byproduct data associated with the one or more field devices;
extracting behavioral information relevant to cyberattacks from the physical byproduct data;
collecting fieldbus sensor data;
fusing the behavioral information and the fieldbus sensor data into a synchronized time series dataset;
performing a simulation of the industrial production environment using the synchronized time series dataset to yield simulated sensor data;
applying a classification algorithm to the simulated sensor data to yield a probability of cyberattack distinguishable from a malfunction; and
generating a prediction of a possible cyberattack by contextualizing the probability of cyberattack with process knowledge relevant to the industrial production environment.

12. The method of claim 11, further comprising:
identifying limits of physical variables used by the programmable logic controller in operating the one or more field devices;
determining current values of the physical variables based on the process data; and
identifying the possible cyberattack if the current values of the physical variables exceed the limits of the physical variables.

13. The method of claim 11, wherein identification of the possible cyberattack comprises:
monitoring a rate of change associated with a physical variable used by the programmable logic controller in operating the one or more field devices;
identifying the possible cyberattack if the rate of change deviates from an expected rate of change.

14. The method of claim 11, wherein identification of the possible cyberattack comprises:
monitoring a first process information variable to yield a first variable history;
monitoring a second process information variable to yield a second variable history;
identifying the possible cyberattack based on a correlation between the first variable history and the second variable history.

15. The method of claim 11, further comprising:
reducing production speed in response to the prediction of the possible cyberattack.

16. The method of claim 11, further comprising:
responding to the prediction of the possible cyberattack by completing production of a current batch and thereafter stopping production.

17. The method of claim 11, further comprising:
performing one or more operations to stop production immediately in response to the prediction of the possible cyberattack.

18. An article of manufacture for intrusion detection in an industrial production environment, the article of manufacture comprising a non-transitory, tangible computer-readable medium holding computer-executable instructions for performing a process comprising:
operating the one or more field devices using process data associated with the one or more field devices;
collecting physical byproduct data associated with the one or more field devices;
extracting behavioral information relevant to cyberattacks from the physical byproduct data;
collecting fieldbus sensor data;
fusing the behavioral information and the fieldbus sensor data into a synchronized time series dataset;
performing a simulation of the industrial production environment using the synchronized time series dataset to yield simulated sensor data;

applying a classification algorithm to the simulated sensor data to yield a probability of cyberattack distinguishable from a malfunction; and generating a prediction of a possible cyberattack by contextualizing the probability of cyberattack with process knowledge relevant to the industrial production environment.

\* \* \* \* \*